July 10, 1928.  1,676,587

A. VANDERVELD

CLOTH MEASURING MACHINE

Filed Sept. 7, 1926   4 Sheets-Sheet 1

Inventor
Anthony Vanderveld
By Frank E. Liverance Jr.
Attorney.

July 10, 1928.
A. VANDERVELD
1,676,587
CLOTH MEASURING MACHINE
Filed Sept. 7, 1926
4 Sheets-Sheet 2
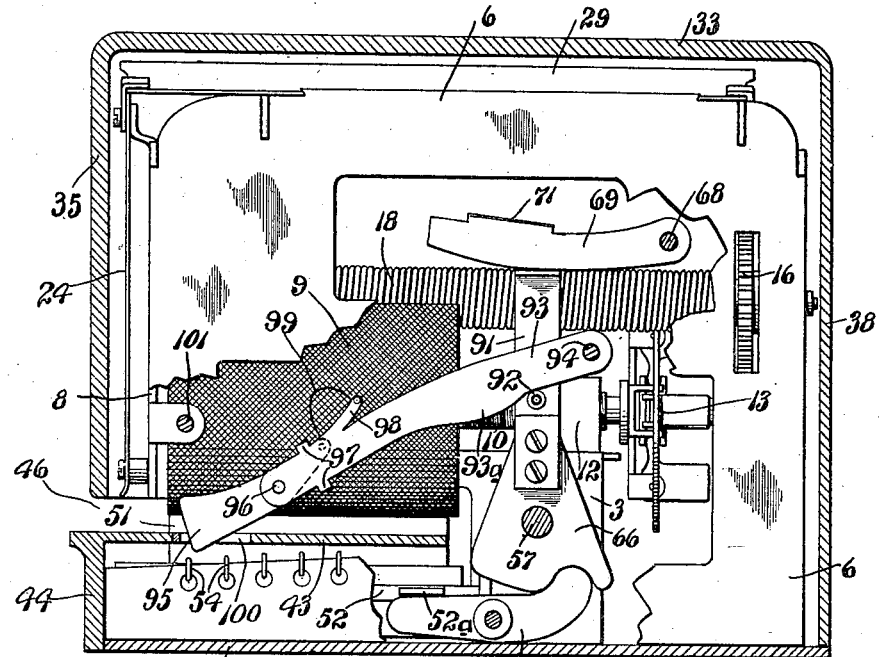
Fig. 3.
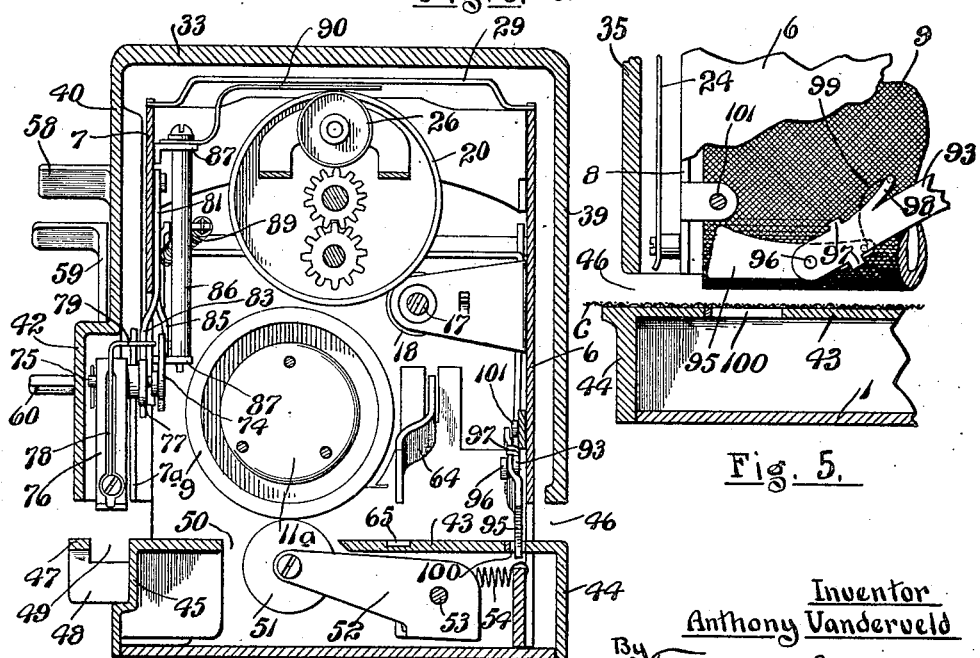
Fig. 4.
Fig. 5.
Inventor
Anthony Vanderveld
By Frank E. Liverance, Jr.
Attorney July 10, 1928.  A. VANDERVELD  1,676,587
CLOTH MEASURING MACHINE
Filed Sept. 7, 1926  4 Sheets-Sheet 3

Inventor
Anthony Vanderveld
By Frank E. Liverance Jr.
Attorney

July 10, 1928.

A. VANDERVELD

CLOTH MEASURING MACHINE

Filed Sept. 7, 1926     4 Sheets-Sheet 4

1,676,587

Inventor
Anthony Vanderveld
By Frank E. Liverance, Jr.
Attorney.

Patented July 10, 1928.

1,676,587

UNITED STATES PATENT OFFICE.

ANTHONY VANDERVELD, OF GRAND RAPIDS, MICHIGAN, ASSIGNOR OF ONE-HALF TO HARRY B. PARRISH, OF GRAND RAPIDS, MICHIGAN.

CLOTH-MEASURING MACHINE.

Application filed September 7, 1926. Serial No. 133,949.

This invention relates to cloth measuring machines, either a cloth measuring or a combined cloth measuring and cost computing machine.

Machines for measuring cloth or similar fabrics in retail drygoods stores are well known and I have heretofore devised and patented many improvements therein, reference to which will be made hereafter. Such machines are operated upon the principle of passing cloth between two rollers, one of which is connected with the mechanism of the machine so as to drive the same and in this manner actuate certain indicators which will indicate the amount of goods which had been passed between the rollers. The other of said rollers is a presser roller which presses the cloth against the measuring roller so that there may be firm engagement and so that the length of cloth passing between the rollers will be accompanied by corresponding movement of the peripheral surface of the measuring roller without any error arising due to slippage of the cloth on or over the surface of the measuring roller.

Machines of this character will accurately measure cloth and indicate the amount which has passed between the rollers providing the cloth is started properly. Inasmuch as in machines of this character the end of the measurement is where a certain notching knife slits or marks the cloth at the end of a measuring operation, the start of the measurement should also be at this point. It is a primary object and purpose of the present invention to insure that one operating the machine will start the end of the cloth which is to be measured at the proper point or in alignment with the notching knife which notches or marks the cloth at the end of a measuring operation. A further object of the invention is to provide novel mechanism operating upon a novel principle whereby, should the goods placed in the machine not be located at the proper starting point, the operator will be informed of this fact through a signal which will be moved into view directly below the eyes of the operator which signal informs the operator the direction in which the goods should be drawn in order to properly start the same for accurate measurement.

In machines of this character the goods should be entered into the machine with the measuring and presser roller separated from each other so that the goods may be drawn directly back into the machine. It is possible however, with prior machines of this character to introduce the goods between the rollers giving the same a diagonal movement; that is, one which will draw the goods inwardly between the rollers and at the same time in the direction of the length of the goods. If this operation is permitted by the machine there is a practical certainty that the measurement will be inaccurate. It is, therefore, a further object of my invention to provide the machine with means whereby goods cannot be entered into the machine between the measuring and presser rollers when said rollers are together but only when the same are separated. Inasmuch as the means used to insure a correct start of the measurement are operative only when the rollers are separated, it is necessary for the completion and perfection of the machine that the goods can not be drawn into place between rollers when the rollers are in contact with each other; and my invention, as said before, has for one of its objects and purposes the provision of such means.

Many other objects and purposes than the two primary purposes stated will be apparent as understanding of the invention is had from the following description taken in connection with the accompanying drawings, in which, Fig. 1 is a longitudinal vertical section through a cloth measuring and computing machine equipped with my invention.

Fig. 3 is a longitudinal vertical section through the machine adjacent one side thereof and illustrating, particularly, the means which blocks the entrance of goods into the machine between the rollers when the same are together.

Fig. 4 is a transverse vertical section through the machine, the section being taken close to the front end thereof.

Fig. 5 is a fragmentary section showing the mechanism illustrated in Fig. 3 in the position it occupies when the rollers have been separated and cloth entered between them.

Like reference characters refer to like parts in the different figures of the drawings.

Figure 1:
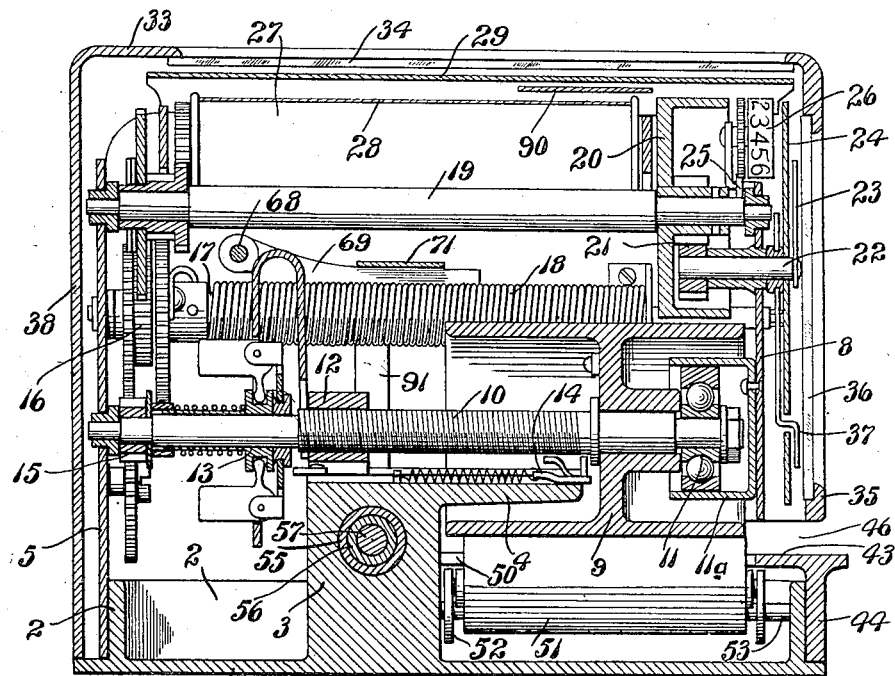

In the construction of the machine, a base 1 of substantially rectangular form is provided having upwardly extending flanges 2 near its edges and between its front and rear ends being formed with an integral vertical post 3 from which a ledge 4 extends at its upward end in a forward direction, as shown. The mechanism of the machine is carried by a frame which is attached at its lower edges to the flanges 2. This frame includes a vertical rear plate 5, a vertical side plate 6, a second vertical side plate 7 and a front vertical plate 8 having a height less than the height of the rear plate 5 and permanently secured at the front edges of the sides 6 and 7. This construction of supporting frame for the mechanism is substantially that shown in my earlier Patent No. 1,420,612, issued June 20, 1922.

A horizontal measuring roller 9 is fixed to a measuring roller shaft 10, at its rear end carried in a suitable bearing supported by the plate 5 and at its front end being rotatably mounted in the bearing 11 carried in a cup shaped housing 11$^a$ secured to the rear side of the plate 8. The shaft 10 is threaded for a portion of its length and carries a nut 12 to move over the upper end of the post 3 and ledge 4, moving forwardly during a measuring operation and to the rear when the mechanism is reset to zero position. This member 12 co-operates with certain speed snubbing mechanism, indicated as a whole at 13, so as to obviate dangerous shock in stopping the mechanism when it returns to zero position. The details of this mechanism form no part of the present invention but have been fully disclosed and claimed in my earlier Patent No. 1,573,589, issued February 16, 1926. During a measuring operation when the nut 12 moves far enough forward on the shaft 10 it operates certain stop mechanism indicated at 14 so as to stop the machine when it has attained a certain limit of measurement. This construction also is shown, described and claimed in an earlier patent to me having No. 1,522,763, issued January 13, 1925, and need not be entered into in detail in the present application.

At the rear end of the shaft 10 a pinion 15 is fixed which engages with and serves to drive a train of gearing indicated as a whole at 16, in this manner, during the progress of a measuring operation, turning the horizontal shaft 17 and thereby winding the coiled spring 18 around it, so as to store and accumulate energy for returning the mechanism to initial starting or zero position when it is released to do so. Also a second horizontal shaft 19 is driven through this gearing. At the front end of the shaft 19 a drum 20 is secured, on which are provided certain indications relating to a whole unit of measurement and fractions thereof; also as the unit of measurement is a yard, this drum carries indications relative to inches of measurement, in practice being marked so as to show thirty six inch divisions of measurement. Through the pinions 21 on the shaft 19 and on a second short shaft 22 said shaft 22 is driven and a pointer or indicator 23 at the front end of the shaft 22 is turned in a circular path in front of a vertical plate 24 on which a suitable indicating scale for fractions of a yard is printed so that the hand or indicator 23 will show indications of the amount of goods which has passed through the machine as well as the drum 20. The shaft 19 near its front end has a radially projecting pin 25 acting to turn a small wheel 26, known as the yards wheel, moving it one step with each rotation of the shaft 19, this yards wheel carrying figures indicating the number of yards which have been measured, the change being from one figure on the wheel 26 to the next higher with each rotation of the shaft 19, shaft 19 being driven so that it turns around once for each yard of goods passing through the machine and actuating the measuring roller 9.

In addition to the indicating devices described the gearing 16 acts to drive the rollers 27 on which a computing chart 28 is mounted all in accordance with what is fully shown in my earlier Patent No. 1,420,612 above noted. The invention which I have devised is operative and serves its functions whether or not the computing chart is a part of the machine, that is, is quite as useful for a measuring machine alone as for a combined measuring and computing machine.

Figure 2:
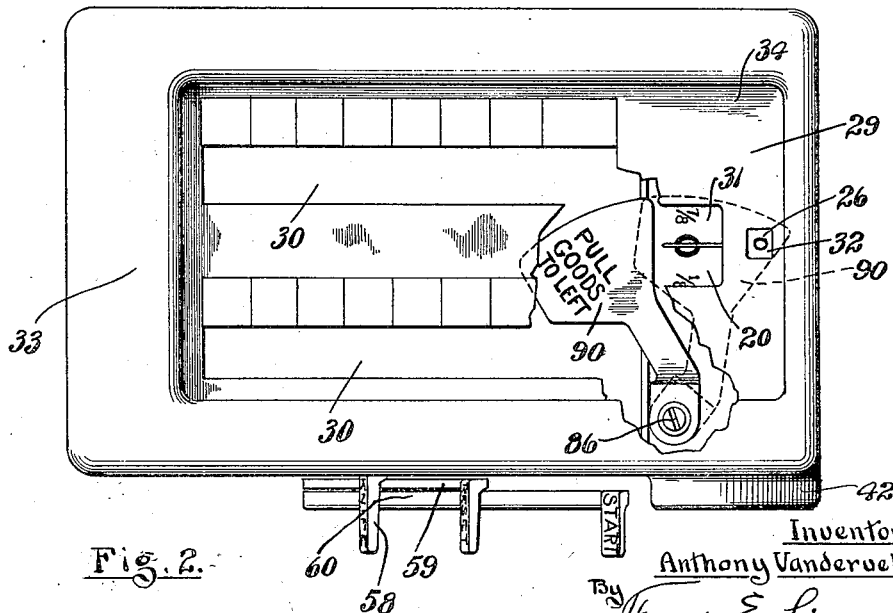
Fig. 2 is a plan view of the machine, certain parts being broken away for a better disclosure.
Figure 6:
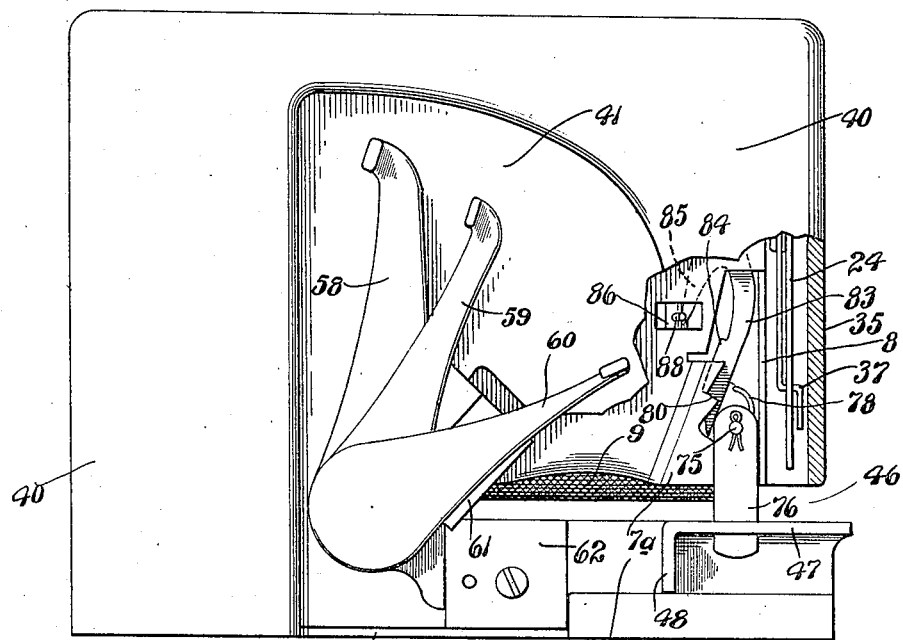
Fig. 6 is a side elevation of the cloth measuring machine of my invention, a part of the enclosing casing at the front being broken away.

Over the computing chart, the drum 20 and yards wheel 26 a sheet metal plate 29 is placed having parallel longitudinal openings 30 through which the computations on the chart are disclosed, the other openings 31 and 32 above the drum 20 and yards wheel 26, respectively, so that one indication of length only appears through each of the openings 31 and 32. Covering the mechanism which has been outlined is an outer enclosing casing or housing. It has a horizontal top 33 which has a large rectangular opening therein in which glass 34 is secured, this permitting one to see the various characters appearing through the openings 30, 31 and 32. The housing has a vertical front 35 which extends downwardly nearly to the lower edge of the roller 9 and it likewise has a front opening closed by glass 36 through which the indicator or pointer 23 may be seen as well as a second yards pointer 37 which is driven in such a manner as to indicate the number of yards of goods which have been measured as fully disclosed in my earlier Patent No. 1,420,612. The housing further includes a vertical back 38, the lower edge of which lies against the base 1 and two parallel vertical sides 39 and 40. The side 40, as best shown in Fig. 6, between its ends is formed with an inwardly pressed section 41 and near its front lower portion with an outwardly extending portion 42, as shown in Figs. 2 and 4, the purpose of which will later appear.

The outer enclosing casing or housing at the front of the machine has its lower edges lying in a plane slightly above the lower side of the measuring roller 9. At this portion of the machine and below the measuring roller a horizontal table 43 is located having a downwardly extending side and a front 44 while the side opposite is formed with an inwardly pressed portion 45, best shown in Fig. 4. The table 43 is disposed a distance below the lower edges of the sides 39 and 40 whereby an entrance slot 46 for the goods to be measured is made. Directly under the outwardly extending portion 42 of the housing a plate 47 is located, the upper side of which lies in the same plane with the table 43 and which at its inner end is turned downwardly as indicated at 48, the plate 47 being longitudinally slotted as shown at 49.

At the upper side of the table 43 a longitudinal opening 50 is made through which the presser roller 51 may move upwardly to engage against the under side of the measuring roller or to press goods to be measured against the measuring roller. The presser roller is mounted on a frame 52 which in turn is rotatably mounted to turn about the axis of a rod 53 said presser roller being normally drawn in an upward direction and against the measuring roller or cloth between them by springs 54.

Through the post 3 two sleeves 55 and 56 and a rod 57 pass, the sleeve 55 being rotatably mounted in the post, sleeve 56 rotatable within the sleeve 55, and the rod 57 rotatable within the sleeve 56. All are mounted for independent movement and any one may be readily turned without affecting the other. The outer sleeve 55 has a lever 58 attached at its outer end outside of the inwardly depressed portion 41 of the side 40 of the enclosing housing, as shown in Fig. 6. Similarly the sleeve 56 is equipped with an operating lever 59 and the rod 57 with an operating lever 60, whereby either sleeve or rod may be turned by manually operating the lever connected thereto. The lever 58 is equipped with a knife blade 61 which is mounted to co-operate with a similar blade 62 attached to the depending side of the table 43. The knife 62 is located a short distance back of the vertical portion 48 turned downwardly from the end of the plate 47, there being a recess between them indicated at 63; and the depending side of the table at this point is recessed inwardly so as to furnish space for the fingers of the operator to grasp the end of the cloth when it is placed between the measuring and presser rollers. Depression of the lever 58 causes the knives 61 and 62 to notch or mark the edge of the cloth and the measurement of the cloth stops at the point where the notch is made.

It is evident that the start of the measurement of the cloth, in order to have accurate measurement, must be at the same point, that is, in alignment with the adjacent vertical sides of the knives 61 and 62.

The lever 59 when operated to turn the sleeve 56 actuates a brake (not shown) to force the same against the measuring roller 9 and simultaneously permits the bar 64 shown in Fig. 4 to drop across the entrance slot 46, its lower edge being received in a recess 65 in the upper side of the table 43. This construction is fully described and claimed in my prior Patent No. 1,443,332, issued in January 23, 1923, and need not be further described in the present application.

Figure 9:
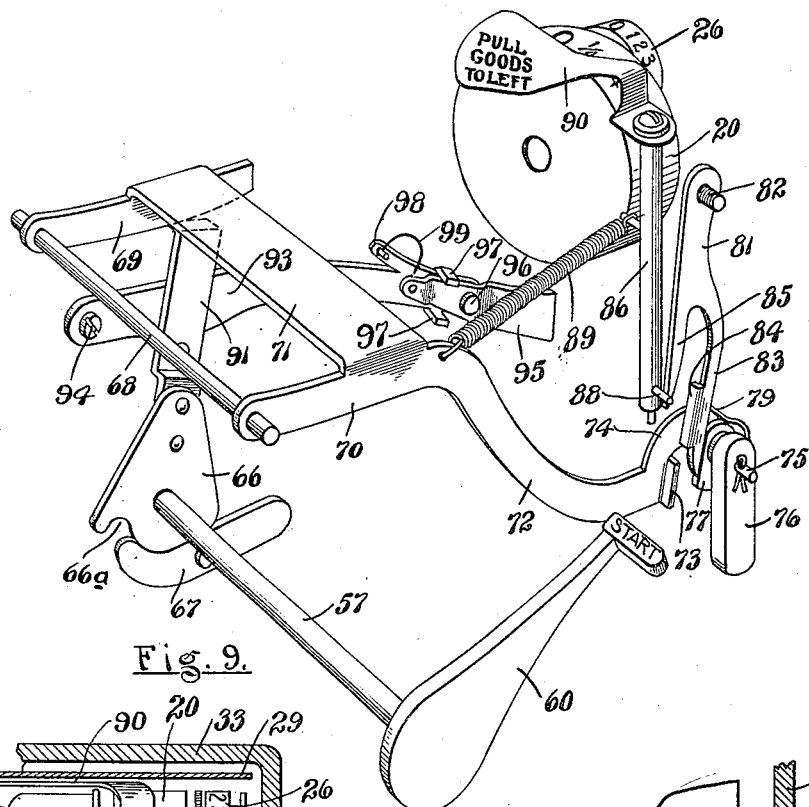
Fig. 9 is a perspective view illustrating certain essential parts of the mechanism of my invention.

When the lever 60 is operated in a downward direction with a consequent turning of the rod 57, a cam plate 66, best shown in Fig. 9, is turned, actuating a lever 67 pivotally mounted between its ends, one end of which is located underneath an arm 52$^a$ (see Fig. 3) which projects from the presser roller frame 52, whereby the presser roller frame is tilted and the presser roller 51 moved in a downward direction away from the measuring roller 9. When the presser roller is against the measuring roller the rear end of the lever 67 fits in a recess 66ᵃ in the cam plate 66; but when the shaft 57 and the plate 66 are turned the upturned end of the lever 67 rides against the under edge of the cam plate depressing the presser roller and holding it in depressed position. Thus far the means for operating the presser roller frame and separating the presser roller from the measuring roller is substantially like that illustrated in my first Patent No. 1,420,612, to which reference has been earlier made.

Between side plates 6 and 7 of the supporting frame and at the rear portion of the machine a cross shaft 68 is mounted. On this shaft a member of sheet metal is mounted for rocking movements, having two sides 69 and 70 connected by a cross plate 71 (see Fig. 9), the side 69 at its under edge being of curved form for a purpose which will later appear. The side 70 is extended toward the front and bent downwardly making an arm 72 which extends nearly to the front of the machine and at its front end is formed with an out turned lip 73 beyond which it is extended as a curved section 74 of the form shown in Figs. 7, 8 and 9. A pin 75 extends laterally through the end of the section 74 on which a short bar 76 is pivotally mounted, the pin passing through the upper end of the bar so that said bar normally hangs vertical and in its lower position passes through slot 49 of the plate 47; while in its upper position it is received within the laterally extending portion 42 of the enclosing housing, as best shown in Fig. 4. On the pin 75 and secured to the block 76 so as to move therewith, is a cam 77. On the block 76 a spring wire 78 is permanently secured at its lower end near the lower end and outer side of the block, extending vertically in a groove in said block above its upper end and being then turned laterally as indicated at 79 so as to lie over the cam 77. The front lower portion of the frame side plate 7 is cutaway and pressed outwardly at 7ᵃ, as shown in Fig. 6, and formed with a shoulder 80 lying at an angle to the horizontal, the purpose of which will later appear.

At the inner side of the side frame plate 7 an irregularly shaped member 83 of flat metal is pivotally suspended from a pivot pin 82 passing through its upper end. The lower portion of the member 81 is bifurcated and formed with two downwardly extending fingers. The first or front finger 83 passes downwardly directly back of the cam 77 and at its rear edge is made with an inturned lip 84 which normally lies in front of the out turned lip 73 on the arm 72. The other and rearmost finger 85 lies back of and is bent inwardly so as to lie in a different vertical plane than the front finger 83. A vertical rock shaft 86 is mounted for turning movements on upper and lower brackets 87 attached to and extending inwardly from the inner side of the plate 7. Near its lower end the rock shaft is equipped with an outwardly extending horizontal pin 88 which normally bears against the rear edge of the finger 85 previously described, being drawn thereagainst by a light coiled spring 89 attached at one end to the arm 72 and at the other end to a pin projecting from the rock shaft 86 in a direction opposite to the pin 88. At the upper end of the rock shaft 86 a signal member 90 is rigidly secured lying directly beneath the plate 29 which has been previously described. In the normal position of the signal member it is drawn by the spring 89 to the rear and back of the openings 31 and 32 in plate 29, but should the member 81 be turned about the pin 82 to the rear it acts to rock the shaft 86 and move the member 90 forward into the position shown in dotted lines in Fig. 2, thereby passing under openings 31 and 32 and covering the drum 20 and the yards wheel 26 and bringing a certain legend printed on the signal member 90 into view which may be seen through the opening 31. This legend which, as shown, is Pull goods to left, is to inform the operator what should be done to properly position the goods for starting in the event that the signal member is thrown from its full line direction shown in Fig. 2, to dotted line position.

A vertical bar 91 is permanently secured at its lower end to the cam plate 66 (see Fig. 3) and extends upwardly therefrom having its upper end turned laterally so as to lie under and bear against the under curved side of the side 69 which has been previously described. It is evident that when the presser roller is separated from the measuring roller the bar 91 is turned forward and the member comprised of the two sides 69 and 70 with arm 72 and the cross connecting plate 71 is permitted to drop by gravity and occupy a lower position, while on the reverse movement of the lever 60 when the presser roller is released to press cloth against the measuring roller, the upper end of arm 91 riding against the under curved edges of the side 69 elevates this structure and lifts the block 76 from lower to a higher position.

A small roller or pin 92 is connected to the vertical bar 91 and extends outwardly therefrom passing underneath a bar 93 pivotally mounted at its rear end, at 94, to the side 6 of the supporting frame. Bar 93 extends downwardly and forwardly and rides on the upper side of the roller 92, being formed at its lower side with a downwardly projecting enlargement 93ᵃ having a curved lower edge so that when the vertical bar 91 is turned in a forward direction roller 92 riding underneath the part 93a serves to elevate bar 93 about its pivot 94. At the front end of the bar 93 an extension 95 is pivotally connected, the pivot pin 96 passing between the ends of the extension 95 and through the front end of the bar 93. That portion of the extension 95 back of the pivot 96 lies between upper and lower inwardly turned tongues 97 integral with the bar 93 a short distance back of the pivot 96. At the upper edge of the bar 93 a short distance back of the upper tongue 97 an arm 98 is formed being curved upwardly and to the rear, as shown in Figs. 5 and 9, and a light spring 99 is connected at its ends to pins projecting from said arm 98 and the rear end of the extension 95. This spring is so disposed that it will serve to hold the rear end portion of the extension 95 against either of the tongues 97 with which it may be engaged, the force of the spring passing across from one side to the other of the pivotal axis of the pivot 96 when the extension 95 is turned from one position to the other. When engaged against the upper tongue 97 the extension 95 is in direct alignment with the bar 93 and with the measuring and presser rollers together, as shown in Fig. 3, the front lower corner of said extension 95 extends through a slot or opening 100 in the table 43. On operating the lever 60 to move the presser roller downward with a consequent elevation of the bar 93 and its extension 95 the front lower corner of said extension 95 is lifted above the slot or opening 100 so that cloth may be freely passed under it. When the cloth is thus entered, its upward movement caused by releasing the presser roller to move upward, moves the extension 95 from the position shown in Fig. 3 to that shown in Fig. 5 whereupon said extension 95 is located with its lower edge substantially horizontal and above the lower side of the measuring roller 9 so that it does not contact with the cloth. When, however, the rollers are separated at the end of a measuring operation with a consequent elevation of the bar 93 the upper corner of the extension 95 strikes against a pin 101 located above it, as shown in Fig. 5, turning it into alignment with the bar 93. When the two rollers are together, as shown in Fig. 3, it is impossible for the operator to get cloth between the rollers by a diagonal pull on the cloth as such operator may attempt to do at times. The operator cannot separate the rollers and attempt to introduce cloth between the same and then by reason of some difficulty in getting the end of the cloth properly located remove the cloth, bring the rollers together and then insert the cloth by a diagonal inward and longitudinal pull on the cloth which could be done otherwise if the bar 93 and its extension 95, mounted and operated as described, were absent. In other words this bar 93 and its extension 95 positively insures that the mechanism which I have devised for giving the proper start to the cloth at the beginning of a measuring operation must be used.

Figures 7, 8:
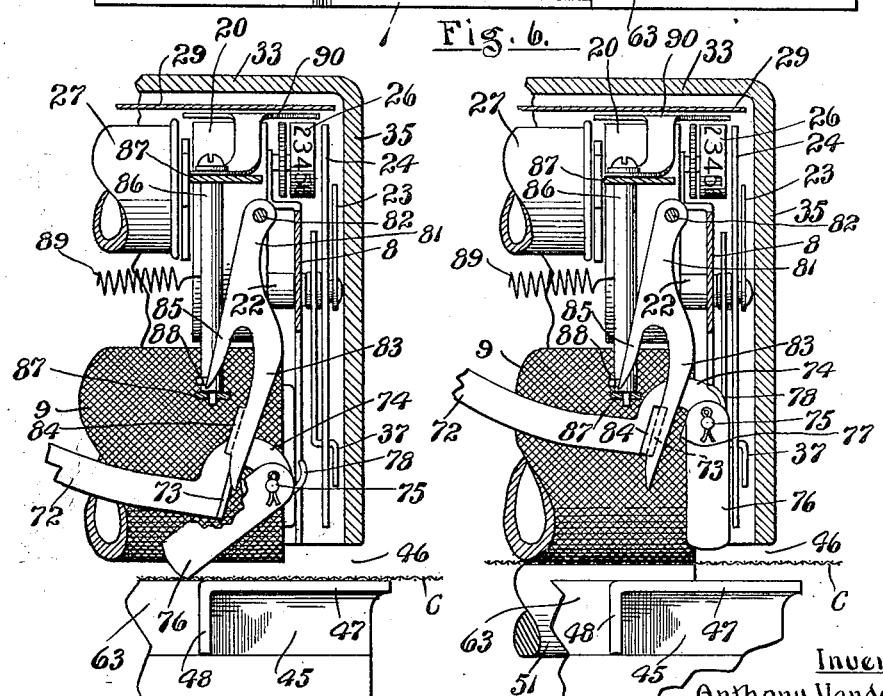
Figs. 7 and 8 are fragmentary vertical longitudinal sections adjacent the front of the machine illustrating two different positions of the means used to insure correct start of the goods to be measured.

In the operation of the structure as described, assuming that the mechanism is at zero position as shown in Fig. 2, that is, with the indications on the drum 20 and yards wheel 26 at zero, if the rollers are not already separated the same may be separated by pressing downwardly upon the lever 60. When this occurs not only is the presser roller 51 moved to and held in lower position away from the measuring roller, but by reason of the movement of the bar 91 (see Fig. 3) the member comprised of the sides 69 and 70 and the cross bar 71 is dropped to lower position whereupon the block 76 passes, at its lower portion, through the slot 49 in the upper side of the plate 48 and is across and to one side of the entrance slot 46 as shown in Fig. 6. The cloth to be measured may now be entered into the machine at said entrance slot between the measuring and presser rollers. The cloth, indicated at C, is grasped by the hands and pulled inwardly, as shown in Fig. 7, whereupon the rear edge of the cloth strikes against the block 76 and turns it about the axis of the pin 75 to the position shown in Fig. 7 with the lower end of the block riding on the upper surface of the cloth. The cam 77 turns with the block 76 and engages against the front lower edge of the finger 83 of member 81 turning said member to the rear about the axis of pin 82 so that the other finger 85 strikes against pin 88 (see Fig. 9) and rocks the vertical rock shaft 86, whereupon the signal member 90 is moved from the full line position shown in Fig. 2 to the dotted line position and covers the drum 20 and the yards wheel 26 at the openings 31 and 32, as indicated in Fig. 2. The legend appearing on the signal member 90, namely, Pull goods to the left, informs the operator what should be done to properly start the goods. That is, the goods should be drawn to the left until the end thereof passes from underneath the block 76, permitting it to fall to vertical position, as in Fig. 6, whereupon the signal member 90 is freed and will be returned to its full line position by the spring 89. The end of the goods will be against the inner side of the block 76 and is then in alignment with the plane of the adjacent surfaces of the knives 61 and 62 so that the start of measurement is exactly at the vertical plane of the finish or end of the measurement and no extra amount over that recorded on the machine will be given such as would be the case if the end of the goods projected a distance beyond this proper starting plane. By reason of the recessed portion at 63 the operator may grasp the end of the goods between the thumb and first finger and hold to the same even though moved back until the goods passes inwardly beyond the inner side of the block 76.

If instead of pulling the goods to the left and properly starting the same, the operator should release the presser roller to elevate it against the cloth and press the cloth against the measuring roller, as shown in Fig. 8, then the signal member 90 will remain at its forwardly turned position, shown in Fig. 8 and also in dotted lines in Fig. 2, even though the block 76 is lifted when the presser roller is released. This follows by reason of the engagement of the two inclined lips 73 and 84 formed, respectively, on the arm 72 and the finger 83, the former of which is turned outwardly and the latter inwardly. The turning of the member 81 to the rear, as shown in Fig. 7 when cloth is entered underneath the block 76, moves the finger 83 so that lip 84 lies back of lip 73 whereupon, when the presser roller is released with a consequent elevation of the arm 72, the lip 73 comes in front of the lip 84, and holds the member 81 at its rearward position even though the block 76 and the cam 77 have been released and are positioned vertically, as shown in Fig. 8. Accordingly the signal member 90 will remain in its forwardly turned position and will cover the drum 20 and yards wheel 26, covering and disguising or at least obscuring the indication marks which otherwise would appear clearly through the openings 31 and 32. The material of which the signal member 90 is made is not of great importance. It may be sheet metal and opaque or it may be of celluloid of any desired degree of transparency; but whenever the operator looks downwardly to note the progress of a measurement, such measurement as would be indicated if the member 90 was at its rear position, is either completely covered or obscured to such an extent that it is not easy to read and the operator knows that an improper start for measuring the goods has been made.

At times, or at least it is possible that the cloth may be moved inwardly and then moved outwardly so as to swing the block 76 to the opposite side of a vertical plane passing through the pin 75. In such case the lateral end portion 79 of the spring member 78 bears against the lower end of the finger 83 and turns it to the rear so that it occupies the same position as it would occupy when turned by the cam 77 and moves the member 90 to the same forward position. This makes it impossible for the operator of the machine to make a wrong start and uncover the drum 20 and the yards wheel 26 by such movement, namely, moving the cloth outward after it had first been moved inward.

It is evident that the block 76 is raised and lowered with the operation of the start lever 60, being lifted when the lever is operated to bring the rollers together and lowered when the rollers are separated. Cloth is placed between the rollers and properly positioned for starting measurement only when the rollers are separated. And after it is properly located the bringing of the rollers together lifts block 76 out of the way so as not to obstruct the movement of the cloth through the machine.

Figure 10:
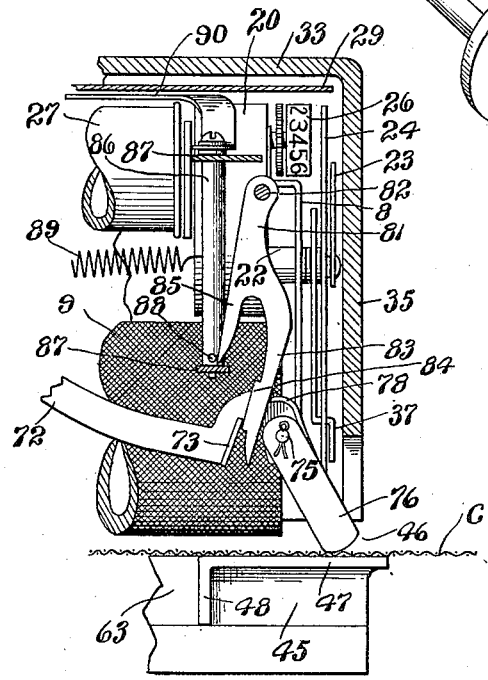
Fig. 10 is a view similar to those shown in Figs. 7 and 8, showing the operation of the parts when the cloth is not started right and is then drawn outwardly.

If the cloth has been properly started and a measuring operation completed the three levers 58, 59 and 60 are depressed in succession thereby notching the goods, setting the brake and dropping the bar 64, and depressing the presser roller 51 with a consequent elevation of the arm 72 and the block 76 carried thereby. In such case the lip 84 turned inwardly from the finger 83 as shown in Fig. 10, moves upwardly in front of the lip 73 because the member 81 has been hanging vertically downwardly and the lip 84 is thus in front of the lip 73. The block 76 on the lowering of the arm 72 drops downwardly and its lower end engages against the cloth. Then, when the cloth is pulled out of the machine in a forward direction, said block 76 is swung to the position shown in Fig. 10. The horizontal lateral end 79 of the spring 78 comes against the front edge of the finger 83 and tends to turn the member 81 rearwardly and thus bring the signal member 90 under the openings 31 and 32. But the lip 84 striking against the lip 73 prevents such rearward movement of the member 81, the spring 78 yielding so that the block 76 may be turned outwardly when the cloth is removed, but there being no movement of the signal member 90 in such case.

When the rollers are separated for the entrance of cloth the bar 93 with its extension 95 is lifted sufficiently that the cloth may be readily passed under the lower corner of said extension. If, for any reason, an operator should try to "beat" the machine by introducing cloth after bringing the two rollers 9 and 51 together, thus elevating the block 76 above the entrance slot 46, it is blocked by the extension 95 to the bar 93, it being impossible to introduce cloth in any manner between rollers when said bar and extension are in lower position, as shown in Fig. 3. If bar 93 and the extension part 95 were not used it would be possible for an operator to release the presser roller and elevate the gauge block 76 and then introduce the cloth between the rollers with a diagonal inward and longitudinal pull thereon, starting the cloth measurement with any indefinite length thereof beyond the proper starting point. But as said before the construction which I have devised in the pivoted bar 93 with its pivot extension 95, absolutely precludes any possibility of such operation of the machine. When the cloth is entered into the machine in the proper manner with the rollers separated and with the extension 95 in alignment with the bar 93, then when the presser roller is released and lifts the cloth upwardly against the measuring roller, it also lifts the cloth against said extension 95 which is automatically snapped to the position shown in Fig. 5 and is out of the way of and does not ride upon the upper surface of the cloth; and when at the end of a measuring operation, the rollers are separated the lift given to the bar 93 simultaneous with the separation of the rollers brings the extension 95 against the pin 101 and snaps said extension into alignment with the bar 93 and in operative position so that if the presser roller is released and an attempt made to insert cloth between the two rollers when the same are together, said extension 95 occupies the position shown in Fig. 3 and positively blocks placing cloth between the two rollers.

Figure 11:
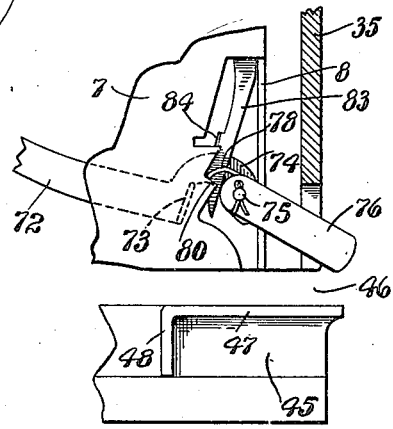
Fig. 11 is a fragmentary vertical section and side elevation at the lower front portion of the machine illustrating an operation of the mechanism and the construction used in view thereof.

The construction described is very practical and efficient and absolutely insures that the cloth measurement of a piece of goods shall start at the proper point. The shoulder 80 made on the outwardly pressed portion 7ª of the plate 7 lies in the path of movement of the end portion 79 of the spring 78 and limits the outward swing of the block 76 and if said block is swung above the position shown in Fig. 11 the weight of the arm 72 and attached parts will be exerted to turn the block 76 back to normal position. This is of comparatively minor importance inasmuch as block 76 will normally return to vertical position by gravity, but should it tend to bind in any manner, the spring will help to throw it back operating on the shoulder 80 as a fulcrum. Absolute insurance that a measurement shall be started at the right point and that there will be no giving away of goods more than what is indicated by the machine, is attained with the construction shown and described. The signal member 90 informs the clerk when a wrong measurement is being started and it stays in place over the drum 20 and yards wheel 26 should a measurement be performed on the machine with the cloth started wrong. While the machine is completely operative even though a measurement is started wrong, the clerk is informed of such fact at the time of beginning the measurement and during all of the time that the machine is being operated to carry out a measurement and at the time of completion of a measurement; and the reading of the measurement made may be either wholly impossible or difficult depending upon the character of material from which the member 90 is made, whether opaque or more or less transparent. If of opaque material the measurement which would appear on the fractions drum 20 and the yards wheel 26 cannot be read and such measurement must be obtained from the front indicator of the machine which is inconvenient to the clerk and is for the purpose of informing the customer rather than the clerk and is not easy for the clerk to observe during the progress of a measuring operation.

The invention is defined in the appended claims and is to be considered comprehensive of all forms of structure coming within their scope.

I claim:

1. In a measuring machine including a measurement indicator actuated by cloth passed through the machine, said machine having a definite starting point, of means movably mounted and adapted in one position to cover said measurement indicator and means for operating said movably mounted means to move it to covered position, said last mentioned means being actuated by placing cloth in the machine with the end of the cloth extending beyond said starting point.

2. In a cloth measuring machine having a measurement indicator actuated by cloth passed through the machine, and having an opening through which indications of cloth measurement may be seen from above, said machine at one side thereof having a definite starting point, of means movably mounted to pass under said opening and over said measurement indication visible through the opening, and cloth actuated means for operating said movably mounted means.

3. In a cloth measuring machine including a measuring roller, indicating means driven by said measuring roller and visible from above the machine, a presser roller normally pressing the cloth against the measuring roller, means to separate the presser roller from the measuring roller, and an entrance slot to the machine for placing cloth between the two rollers when the same are separated, combined with cloth marking means located at one side of the entrance slot to mark the end of a measurement of cloth, a movably mounted member located across said entrance slot when the rollers are separated having its inner side substantially in the vertical plane of said marking means and adapted to be moved by cloth passed into said entrance slot between the rollers should the end of the cloth extend beyond the plane of the marking means, a flat member normally located back of and over the indicating means, and means to which said flat member is connected actuated by said member when the same is operated by the cloth as it is placed between said rollers.

4. A construction containing the elements in combination defined in claim 3, combined with means for elevating said movable member above the entrance slot when the presser roller is released to press cloth against the measuring roller.

5. A construction containing the elements in combination defined in claim 3, combined with means for elevating said movable member above the entrance slot of the machine when the presser roller is released to press cloth against the measuring roller, and means for holding said flat member in the position to which it has been moved by the entrance of cloth between said rollers when said presser roller is released.

6. In a machine for measuring cloth, rollers between which the cloth is drawn longitudinally, said rollers being actuated by the cloth, indicating mechanism at the upper side of the machine, means for driving said indicating mechanism from one of said rollers, a plate covering the indicating mechanism having an opening through which measurement indications of said measuring means are visible from above, cloth marking means located at one side of the machine for marking the end of a measurement, a vertical shaft, a flat plate secured at the upper end of the shaft lying below said first plate and normally back of the opening therein, a pivotally mounted member having its inner side located in the same vertical plane with the marking means and adapted to be moved by the cloth when it is placed between the rollers for measurement should the end of the cloth extend beyond the vertical plane of said marking means, and means interposed between said pivotally mounted member and the shaft for turning said shaft when said member is moved by the cloth so as to bring said flat plate under the opening in the first mentioned plate and over the indicating means.

7. A construction containing the elements in combination defined in claim 6, combined with means for separating the presser roller from the measuring roller and holding it in such position, and means operated simultaneously with the movement of the presser roller for lowering said pivotally mounted member when the presser roller is separated by the measuring roller and elevating said pivotally mounted member when said presser roller is released to bear against the measuring roller or press cloth thereagainst.

8. In combination, a measuring roller, indicating mechanism, means for driving the indicating mechanism from the measuring roller, said indicating mechanism being located above the measuring roller, a presser roller to press cloth against the measuring roller, manually operated means for moving the presser roller away from the measuring roller and for releasing the same to press against the measuring roller or press cloth thereagainst, cloth marking means at one side of the machine for marking the end of a measurement of cloth which is drawn between the rollers, a pivotally mounted member located at the same side of the machine in front of the marking means having its inner side lying in the vertical plane of said marking means, movably mounted means to which said pivotally mounted member is connected, means for lowering and raising said movably mounted means with the separation and release of the presser roller whereby when the presser roller is separated from the measuring roller said pivotally mounted member is lowered into the path of movement of the cloth and when the presser roller is released it is elevated above the path of the cloth, a vertical rock shaft, a plate secured to the upper end thereof and lying in a plane above the indicating means and normally back thereof, and means for turning said rock shaft interposed between the same and the pivotally mounted member when said pivotally mounted member is moved rearwardly on the passage of cloth between the separated rollers should the end of the cloth extend beyond the vertical plane of said marking means.

9. A construction containing the elements in combination defined in claim 8, combined with additional means for preventing the entrance of cloth between the rollers when said rollers are together and the pivotally mounted member is elevated, and means for lifting said additional means to inoperative position when the rollers are separated.

10. A construction containing the elements in combination defined in claim 8, combined with means attached to and extending above said pivotally mounted member whereby said rock shaft is turned to carry said plate over the indicating mechanism on pivotal movement of said member in a forward direction, substantially as described.

11. In combination, a measuring roller, indicating mechanism, means for driving the indicating mechanism from the measuring roller, said indicating mechanism being located above the measuring roller, a presser roller to press cloth against the measuring roller, manually operating means for moving the presser roller away from the measuring roller and to release the same to press against the measuring roller or press cloth thereagainst, means adapted to positively prevent the entrance of cloth between the rollers when said rollers are together, means for lowering said cloth entrance prevention means to operative position when the presser roller is released to bear against the measuring roller and for moving said cloth entrance prevention means out of the way to permit the entrance of cloth between the rollers when the presser roller is moved and held away from the measuring roller.

12. In a cloth measuring machine, the combination of a pair of rollers, indicating means operated by one of the rollers, a housing covering said rollers and indicating means having an entrance slot for the entrance of cloth between the rollers, a table at the lower side of the entrance slot over which cloth may be drawn, said table having an opening in its upper side through which one of the rollers projects, and said table having a recess in its upper side, a pivotally mounted bar, the free end of which is adapted to lie across said entrance slot with its lower front portion located in said recess in the table, means for moving one of the rollers away from the other and holding it in separated position, means for lifting the free end of said bar upon separation of the rollers and for releasing said bar to drop to lower position upon release of the movable roller to press against the other roller.

13. In combination, a pair of rollers, one of said rollers being a measuring roller, indicating means operated by the measuring roller, a housing covering the rollers and indicating means having a horizontal entrance slot whereby cloth may be passed thereinto between said rollers, means for separating the other of said rollers from the measuring roller and holding it in separated position, a horizontal table located at the lower side of said entrance slot having an opening therethrough, a bar pivotally mounted at one end and at its free end adapted in lower position to lie across the entrance slot with its lower front portion passing through the opening in the table, means for lifting said bar to an upper inoperative position when said other roller is moved away from the measuring roller and for freeing the bar to drop to lower operative position when said other roller is released to press against the measuring roller.

14. In a machine for measuring cloth or the like, the combination of a pair of rollers, indicating means operated by one of the rollers, a housing enclosing said rollers and indicating means having a horizontal entrance slot located in a plane substantially that of the meeting sides of the rollers, means for blocking cloth entrance into said slot, a table at the lower side of the slot having an opening therethrough into which said means extends when in operative position, means for separating the other of said rollers from the roller which operates the indicating means and a single manually operable means for separating the rollers and returning them to engaging position and for simultaneously moving said cloth entrance blocking means to inoperative position when the rollers are separated and for freeing the same to drop to operative position when the rollers are brought together.

15. In a machine for measuring cloth or the like including a measurement indicator operated by cloth passed longitudinally through the machine, said machine having a definite starting point, of a signal, and means actuated by the cloth as it is placed in the machine to move said signal into view of the operator should the end of the cloth extend beyond said starting point and thereby inform the operator of improper start of the measuring operation.

16. In a measuring machine including a measurement indicator operated by cloth passed through the machine, said machine having a definite starting point and having an opening at its upper side, of a signal normally located back of said opening and invisible to the operator, and means operated by the cloth as it is placed in the machine acting to move said signal forward into view through said opening should the end of the cloth extend beyond said starting point and thereby inform the operator of a wrong start of the measuring operation.

17. A machine for measuring cloth or the like including a measurement indicator actuated by cloth passed through the machine, said machine having a definite starting point, of a signal operated by cloth as it is placed in the machine and moved into position to be seen by the operator should the end of the cloth extend beyond said starting point, and means for holding said signal in the position to which it has been moved during a measuring operation started with the end of the cloth extending beyond said starting point.

18. In a measuring machine including a measurement indicator actuated by cloth passed through the machine, said machine having a definite starting point, of means operated by the cloth should the end of the cloth extend beyond said starting point, and means carrying instructions to the operator operatively associated with said cloth operated means to be moved into view of the operator to disclose said instructions on operation of said cloth actuated means.

19. In a cloth measuring machine having a measurement indicator actuated by cloth passed through the machine, said machine at one side thereof having a definite starting point, of means actuated by the cloth as it is placed in the machine should the end of the cloth extend beyond said starting point, and additional instruction carrying means connected with said cloth actuated means whereby there is brought into view of the operator instructions for informing the operator how to move the cloth that it may be properly started.

20. In a cloth measuring machine having a measurement indicator actuated by cloth passed through the machine, said machine at one side thereof having a definite starting point, of means carrying instructions to the operator, means actuated by the cloth as the cloth is placed in the machine should the end of the cloth extend beyond said starting point, for moving said instruction carrying means, whereby said instructions are brought into view for informing the operator the direction in which to move the goods for proper starting, and means automatically returning said instruction carrying means out of view when the cloth has been moved to proper starting point.

In testimony whereof I affix my signature.

ANTHONY VANDERVELD.